US012775175B2

(12) United States Patent
Wu

(10) Patent No.: US 12,775,175 B2
(45) Date of Patent: Oct. 27, 2026

(54) LASER LIGHT SOURCE COMBINER SYSTEM

(71) Applicant: DELTA ELECTRONICS, INC., Taoyuan City (TW)

(72) Inventor: Kuo-Tung Wu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 886 days.

(21) Appl. No.: 18/092,448

(22) Filed: Jan. 3, 2023

(65) Prior Publication Data

US 2024/0036341 A1 Feb. 1, 2024

(30) Foreign Application Priority Data

Jul. 26, 2022 (CN) ......................... 202210883294.1

(51) Int. Cl.
*G02B 27/14* (2006.01)

(52) U.S. Cl.
CPC ......... *G02B 27/141* (2013.01); *G02B 27/145* (2013.01)

(58) Field of Classification Search
CPC ............................ G02B 27/141; G02B 27/145
USPC .......................................................... 359/634
See application file for complete search history.

(56) References Cited

U.S. PATENT DOCUMENTS

2013/0088471 A1* 4/2013 Kitano ............... G02B 27/1026 345/208
2017/0097560 A1 4/2017 Matsubara et al.
2018/0284586 A1 10/2018 Yang et al.
2019/0391470 A1 12/2019 Pan et al.
2020/0124952 A1 4/2020 Guo et al.
2020/0285138 A1 9/2020 Kurata et al.
2022/0009149 A1 1/2022 Feng et al.

FOREIGN PATENT DOCUMENTS

| | | |
|---|---|---|
| CN | 104820334 B | 6/2018 |
| CN | 108761981 A | 11/2018 |
| CN | 109932858 A | 6/2019 |
| CN | 108572498 | 12/2019 |
| CN | 110596999 A | 12/2019 |
| CN | 210038427 U | 2/2020 |
| CN | 111025833 A | 4/2020 |
| CN | 210270496 U | 4/2020 |
| CN | 111190322 A | 5/2020 |
| JP | 2019061237 A | 4/2019 |
| TW | I366643 B | 6/2012 |
| WO | 2020253434 A1 | 12/2020 |

* cited by examiner

*Primary Examiner* — Bumsuk Won
*Assistant Examiner* — Mitchell T Oestreich
(74) *Attorney, Agent, or Firm* — CKC & Partners Co., LLC

(57) ABSTRACT

A laser light source combiner system includes a laser light source, a phosphor wheel, a first dichroic filter located between the laser light source and the phosphor wheel, and a dichroic filter assemble located between the first dichroic filter and the laser light source. The laser light source is configured to emit a first blue light traveling along a first direction. The phosphor wheel is configured to reflect a portion of the first blue light so as to form a second blue light and to convert a portion of the second blue light into a fluorescent light. The first dichroic filter is configured to make the second blue light partially transmit and partially reflected and make the fluorescent light transmit. The dichroic filter assemble is configured to reflect the second blue light and the fluorescent light.

17 Claims, 4 Drawing Sheets

LASER LIGHT SOURCE COMBINER SYSTEM

CROSS-REFERENCE TO RELATED APPLICATION

This application claims priority to China Application Serial Number 202210883294.1, filed Jul. 26, 2022, which is herein incorporated by reference in its entirety.

BACKGROUND

Field of Invention

The present invention relates to a laser light source combiner system.

Description of Related Art

In a conventional combiner system, the blue light enters a combiner lens through the filter, and the blue light enters an optical channel subsequently. Since the blue light is concentrated, the divergent angle of the blue light is smaller than the divergent angles of other color lights. As a result, uniformity of the white light is poor. Therefore, the blue light may be reflected many times in the optical channel to increase the divergent angle. However, reduction of the intensity of other color lights occurs after the color lights are reflected many times.

Accordingly, it is still a development direction for the industry to provide a laser light source combiner system that can solve the problems mentioned above.

SUMMARY

One aspect of the present invention is a laser light source combiner system.

In some embodiments, the laser light source combiner system includes a laser light source, a phosphor wheel, a first dichroic filter, and a filter assemble. The laser light source is configured to emit a first blue light traveling along a first direction. The phosphor wheel and the laser light source are arranged along the first direction. The phosphor wheel is configured to reflect a portion of the first blue light so as to form a second blue light and to convert a portion of the first blue light into a fluorescent light. The second blue light travels along a reversed direction of the first direction. The first dichroic filter is located between the laser light source and the phosphor wheel. The first dichroic filter overlaps the second blue light. The first dichroic filter is configured to partially transmit and partially reflect the second blue light and to transmit the fluorescent light. The filter assemble is located between the first dichroic filter and the laser light source. The filter assemble is configured to reflect the second blue light and reflect the fluorescent light.

In some embodiments, the first dichroic filter is free from overlapping with the first blue light.

In some embodiments, the filter assemble is configured to transmit the first blue light completely.

In some embodiments, the laser light source combiner system further includes a combiner lens. The combiner lens and the first dichroic filter are arranged along a second direction, and the combining lens and the filter assemble are arranged along the second direction.

In some embodiments, the filter assemble further includes a second dichroic filter and a reflector. The second dichroic filter includes a first region and a second region. The first region overlaps the first blue light, and the second region overlaps the second blue light. The first region and the second region overlap the fluorescent light. The first region of the second dichroic filter is configured to transmit the first blue light completely and reflect the fluorescent light, and the second region of the second dichroic filter is configured to transmit the second blue light completely and reflect the fluorescent light. The reflector is located between the second dichroic filter and the laser light source, and the reflector overlaps the second region of the second dichroic filter.

In some embodiments, the reflector and the second dichroic filter have a distance therebetween.

In some embodiments, the filter assemble includes an optical adhesive layer located between the reflector and the second dichroic filter.

In some embodiments, the combiner lens has an optical axis in parallel with the second direction, and the reflector and the first dichroic filter are arranged symmetrically relative to the optical axis.

In some embodiments, the laser light source combiner system further includes a third dichroic filter. The first dichroic filter and the third dichroic filter are arranged in parallel. The third dichroic filter overlaps the first blue light, and the third dichroic filter is configured to transmit the first blue light completely.

In some embodiments, the filter assemble includes a second dichroic filter having a first region and a second region. The first region overlaps the first blue light, and the second region overlaps the second blue light and the fluorescent light. The first region is configured to transmit the first blue light, and the second region is configured to reflect the second blue light.

Another aspect of the present invention is a laser light source combiner system.

In some embodiments, the laser light source combiner system includes a laser light source, a phosphor wheel, a first dichroic filter, and a filter assemble. The laser light source is configured to emit a first blue light traveling along a first direction. The phosphor wheel and the laser light source are arranged along the first direction. The phosphor wheel is configured to reflect a portion of the first blue light so as to form a second blue light and to convert a portion of the first blue light into a fluorescent light. The second blue light travels along a reversed direction of the first direction. The first dichroic filter is located between the laser light source and the phosphor wheel. The filter assemble is located between the first dichroic filter and the laser light source. The filter assemble includes a first region and a second region. The first region overlaps the first blue light, and the second region overlaps the second blue light. A transmittance for the second blue light of the first dichroic is greater than a transmittance for the second blue light of the second region of the filter assemble, and a transmittance for the second blue light of the first region of the filter assemble is different from the transmittance for the second blue light of the second region of the filter assemble.

In some embodiments, the first region of the filter assemble is configured to transmit the first blue light completely and reflect the fluorescent light.

In some embodiments, the second region of the filter assemble is configured to reflect the second blue light and reflect the fluorescent light.

In some embodiments, the laser light source combiner system further includes a combiner lens. The combiner lens and the first dichroic filter are arranged along a second direction, and the combining lens and the filter assemble are arranged along the second direction.

In some embodiments, the filter assemble includes a second dichroic filter and a reflector. The second dichroic filter overlaps the first region and the second region. The reflector is located between the second dichroic filter and the laser light source, and the reflector overlaps the second region.

In some embodiments, the combiner lens has an optical axis in parallel with the second direction, and the reflector and the first dichroic filter are arranged symmetrically relative to the optical axis.

In some embodiments, the laser light source combiner system further includes a third dichroic filter. The first dichroic filter and the third dichroic filter are arranged in parallel. The third dichroic filter overlaps the first blue light, and the third dichroic filter is configured to transmit the first blue light completely.

In some embodiments, the filter assemble includes a second dichroic filter having a first region and a second region. The first region overlaps the first blue light, and the second region overlaps the second blue light and the fluorescent light. The first region is configured to transmit the first blue light, and the second region is configured to reflect the second blue light.

In the aforementioned embodiments, the divergent angle and area of a cross section of the second blue light traveling towards the combiner lens can be increased by disposing a first dichroic filter and by dividing the second blue light into two portions, and therefore the blue light uniformity is improved. The divergent angles and areas of the cross sections of the second blue light and the fluorescent light passed the combiner lens are similar, and therefore the intensity uniformity of the combined light is improved. In other words, with such design, there is no need to reflect the blue light in the optical channel many times to improve the light uniformity. Therefore, the laser light source combiner system of the present disclosure can reduce the length of the optical channel and improve the blue light uniformity. In addition, a shorter optical channel can avoid reduction of the light intensity of other color lights (e.g., yellow light, red light, and green light) after being reflected many times.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
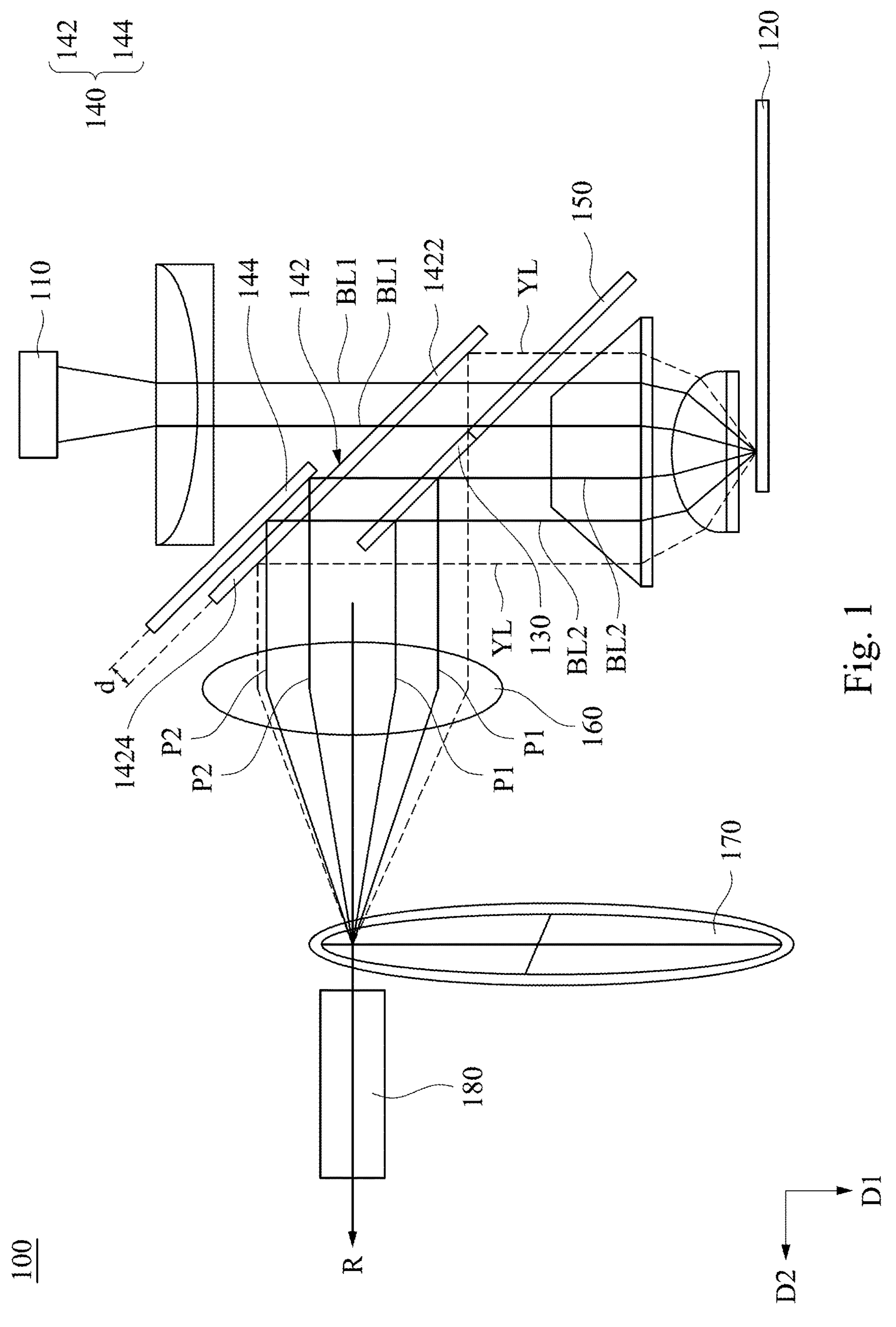
FIG. 1 is a schematic of a laser light source combiner system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic of a laser light source combiner system 100 according to one embodiment of the present disclosure. The laser light source combiner system 100 includes a laser light source 110, a phosphor wheel 120, a first dichroic filter 130, a filter assemble 140, and a combiner lens 160. The phosphor wheel 120 and the laser light source 110 are arranged along a first direction D1. The laser light source 110 is configured to emit a first blue light BL1. The first blue light BL1 travels along the first direction D1. The first direction D1 is a direction pointing towards the phosphor wheel 120 from the laser light source 110. The phosphor wheel 120 is configured to reflect a portion of the first blue light BL1 so as to form a second blue light BL2 and to convert a portion of the first blue light BL1 into a fluorescent light YL. The second blue light BL2 and the fluorescent light YL travel along a reversed direction of the first direction D1, which is a direction pointing towards the laser light source 110 from the phosphor wheel 120.

The first dichroic filter 130 is located between the laser light source 110 and the phosphor wheel 120. The filter assemble 140 is located between the first dichroic filter 130 and the laser light source 110. The combiner lens 160 and the first dichroic filter 130 are arranged along a second direction D2, and the combiner lens 160 and the filter assemble 140 are arranged along a second direction D2. The second direction D2 is substantially perpendicular to the first direction D1. The first dichroic filter 130 is disposed between the laser light source 110 and the phosphor wheel 120 obliquely. That is, a normal direction of the first dichroic filter 130 is different from the first direction D1 and the second direction D2.

The first dichroic filter 130 is configured to partially transmit and partially reflect the second blue light BL2 and to transmit the fluorescent light YL. The "partially transmit" herein means that the transmittance is about 50%, but the present disclosure is not limited thereto. Therefore, the first dichroic filter 130 can reflect another portion of the second blue light BL2, and therefore this portion of the second blue light BL2 travels towards the combiner lens 160. As shown in FIG. 1, a portion of the second blue light BL2 reflected by the first dichroic filter 130 travels along an optical axis R and passes a lower part of the combiner lens 160. This portion is first portion P1 of the second blue light BL2. A direction of the optical axis R is parallel with the second direction D2. The fluorescent light YL produced by the phosphor wheel 120 travels to the filter assemble 140 after passing the first dichroic filter 130.

The filter assemble 140 is configured to reflect a portion of the second blue light BL2 that has passed the first dichroic filter 130 such that this portion of the second blue light BL2 travels along the optical axis R and passes an upper part of the combiner lens 160. This portion is second portion P2 of the second blue light BL2. The filter assemble 140 is configured to reflect the fluorescent light YL that has passes the first dichroic filter 130. The fluorescent light YL travels along the second direction D2 after being reflected by the filter assemble 140. The fluorescent light YL travels to the combiner lens 160 along the optical axis R.

As shown in FIG. 1, the filter assemble 140 of the present disclosure includes a second dichroic filter 142 and a reflector 144. The second dichroic filter 142 includes a first region 1422 and a second region 1424. The first region 1422 overlaps the first blue light BL1. The second region 1424 overlaps the second blue light BL2. The first region 1422 and the second region 1424 overlap the fluorescent light YL. The first region 1422 of the second dichroic filter 142 is configured to transmit the first blue light BL1 completely and reflect the fluorescent light YL. The second region 1424 of the second dichroic filter 142 is configured to transmit the second blue light BL2 completely and reflect the fluorescent light YL. The reflector 144 is located between the second dichroic filter 142 and the laser light source 110. The reflector 144 overlaps the second region 1424 of the second dichroic filter 142. The reflector 144 does not overlap the first region 1422 of the second dichroic filter 142. In the present embodiment, the reflector 144 and the second dichroic filter 142 have a distance d therebetween. The distance d is about 20 mm, but the present disclosure is not limited thereto.

As shown in FIG. 1, the first dichroic filter 130 of the present disclosure overlaps the second blue light BL2, and the first dichroic filter 130 does not overlap the first blue light BL1. In other words, the range covered by the first dichroic filter 130 is smaller than the range covered by the filter assemble 140. The laser light source combiner system 100 further includes a third dichroic filter 150. The first dichroic filter 130 and the third dichroic filter 150 are arranged in parallel, and the third dichroic filter 150 overlaps the first blue light BL1. The third dichroic filter 150 is configured to transmit the first blue light BL1 completely. In other words, the first dichroic filter 130 and the third dichroic filter 150 can be considered as a composite lens having different transmittance for blue light.

In the laser light source combiner system 100, the first blue light BL1 emitted from the laser light source 110 passes the second dichroic filter 142 of the filter assemble 140, and the first blue light BL1 subsequently passes the third dichroic filter 150. Since the second dichroic filter 142 and the third dichroic filter 150 can transmit the first blue light BL1 completely, the optical efficiency loss of the first blue light BL1 can be minimized when the first blue light BL1 travels to the phosphor wheel 120.

As described above, the first portion P1 of the second blue light BL2 is reflected by the first dichroic filter 130, the second portion P2 of the second blue light BL2 is reflected by the reflector 144 after passing the second dichroic filter 142. The reflector 144 and the first dichroic filter 130 are arranged symmetrically relative to the optical axis R. In other words, the first portion P1 of the second blue light BL2 reflected by the first dichroic filter 130 and the second portion P2 of the second blue light BL2 reflected by the reflector 144 have similar divergent angles and areas of cross sections. As such, angles of the blue lights travel along the optical axis that have passed the upper part and the lower part of the combiner lens 160 is increased, and therefore the uniformity of the combined blue light is improved. Accordingly, divergent angles and areas of the cross sections of the second blue light BL2 and the fluorescent light YL passed the combiner lens 160 are similar, and therefore the intensity uniformity of the combined light is improved. The combined light subsequently passes the color wheel 170 and the optical channel 180 so as to produce uniform whit light. In other words, with aforementioned design, there is no need to reflect the blue light in the optical channel 180 many times to improve the light uniformity. Therefore, the length of the optical channel 180 of the laser light source combiner system 100 of the present disclosure can be reduced and the blue light uniformity can be improved. In addition, a shorter optical channel 180 can avoid reduction of the light intensity of other color lights (e.g., yellow light, red light, and green light) after being reflected many times.

The filter assemble 140 of the laser light source combiner system 100 are composed by the second dichroic filter 142 and the reflector 144, and there is no need to form multiple different coatings on the opposite surfaces of the second dichroic filter 142. Therefore, manufacturing cost of the laser light source combiner system 100 can be reduced. In addition, the second dichroic filter 142 and the reflector 144 of the filter assemble 140 are not in contact with each other. Therefore, the relative distance between the reflector 144 and the first dichroic filter 130 can be adjusted without moving the second dichroic filter 142. It is beneficial to the symmetrical arrangement between the reflector 144 and the first dichroic filter 130 relative to the optical axis R.

Figure 2:
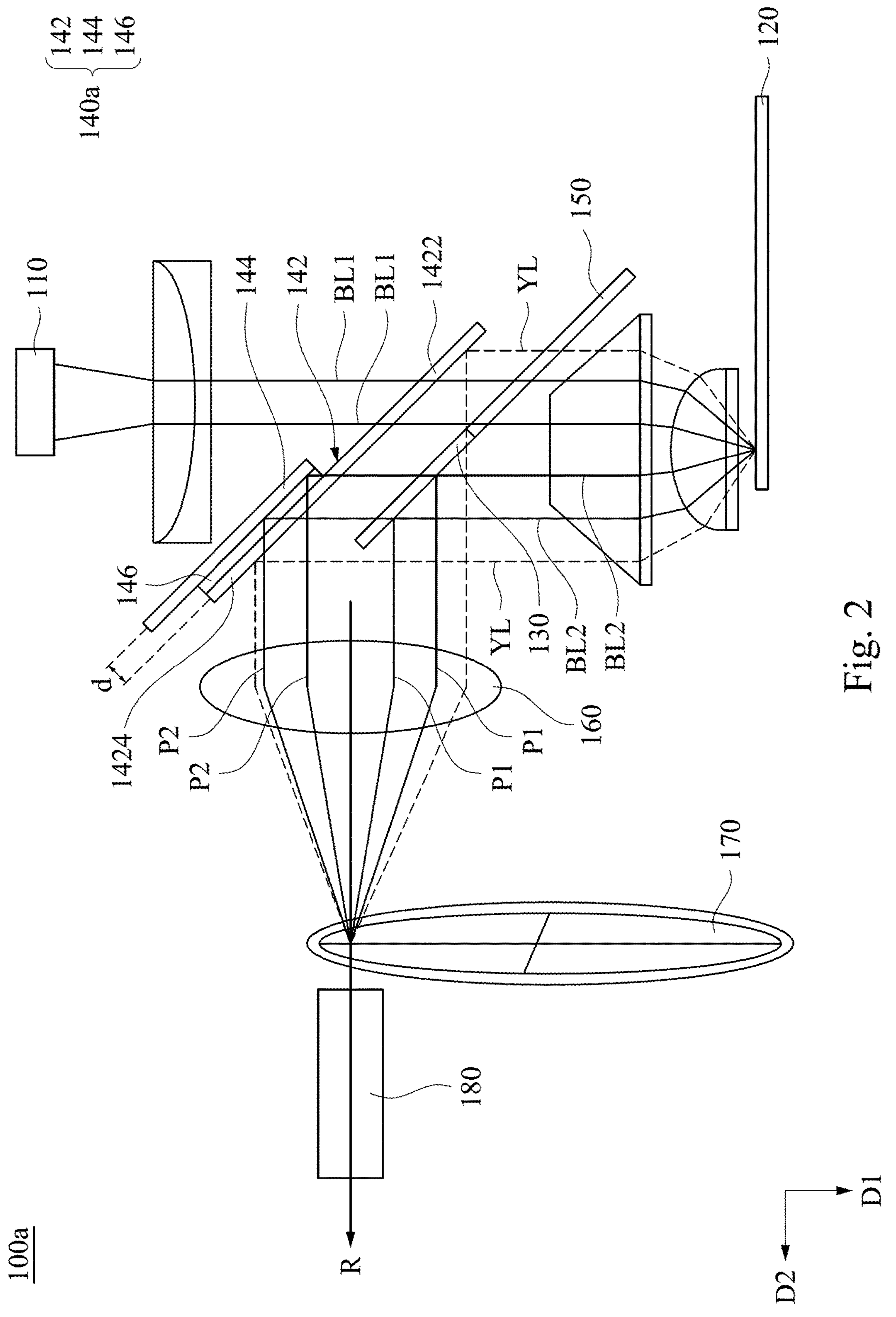
FIG. 2 is a schematic of a laser light source combiner system according to another embodiment of the present disclosure.

FIG. 2 is a schematic of a laser light source combiner system 100*a* according to another embodiment of the present disclosure. The laser light source combiner system 100*a* is similar to the laser light source combiner system 100, and the difference is that the filter assemble 140*a* includes an optical adhesive layer 146. The optical adhesive layer 146 is located between the reflector 144 and the second dichroic filter 142. The second dichroic filter 142 and the reflector 144 are adhered by the optical adhesive layer 146. The laser light source combiner system 100*a* and the laser light source combiner system 100 have the same advantages, and therefore the description is not limited hereinafter.

Figure 3:
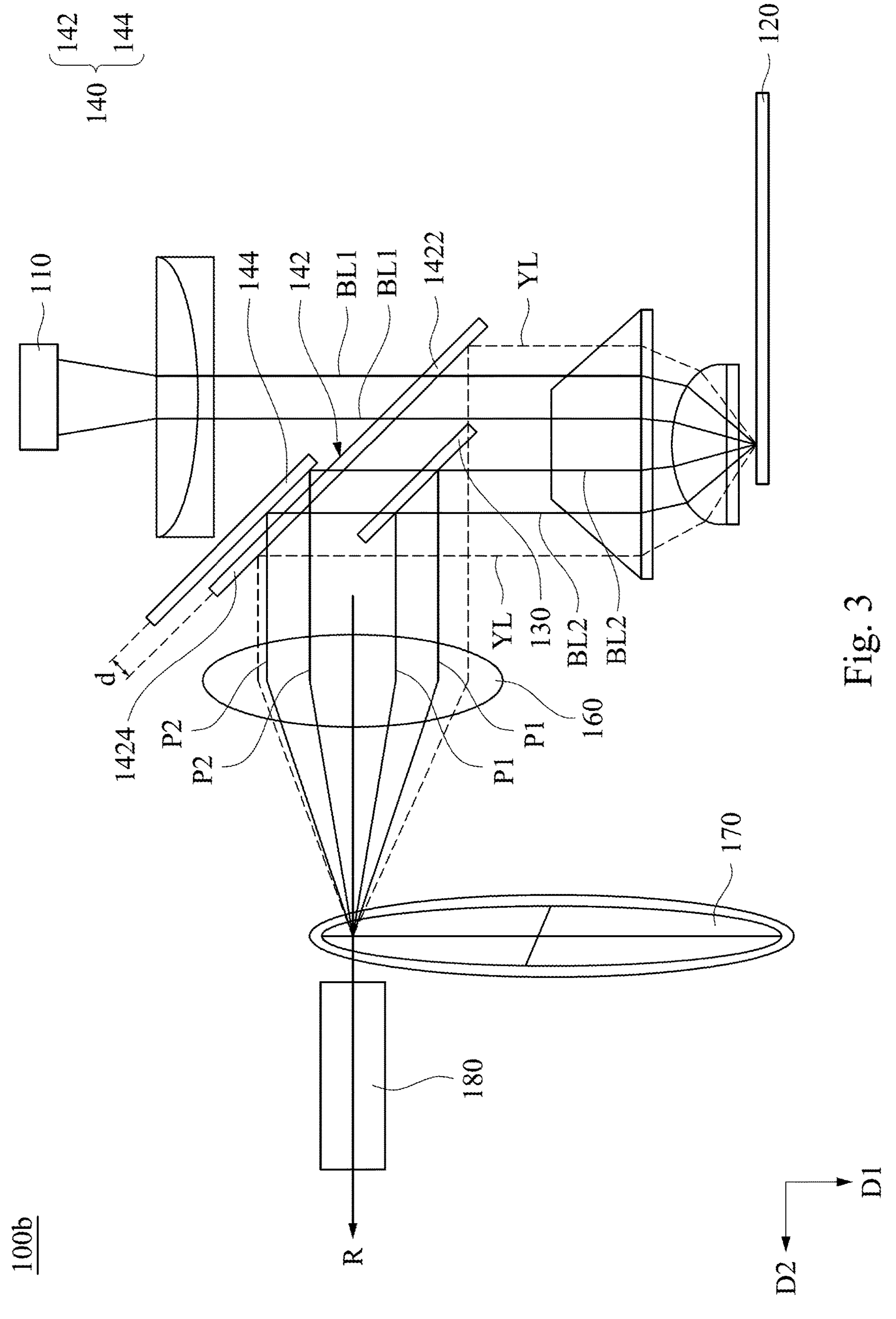
FIG. 3 is a schematic of a laser light source combiner system according to another embodiment of the present disclosure.

FIG. 3 is a schematic of a laser light source combiner system 100*b* according to another embodiment of the present disclosure. The laser light source combiner system 100*b* is similar to the laser light source combiner system 100 shown in FIG. 1, and the difference is that the laser light source combiner system 100*b* has no third dichroic filter 150. Therefore, the blue light emitted from the laser light source 110 travels to the phosphor wheel 120 after passing the second dichroic filter 142 of the filter assemble 140. The laser light source combiner system 100*b* and the laser light source combiner system 100 have the same advantages, and therefore the description is not limited hereinafter.

It is noted that, the laser light source combiner system 100*b* in FIG. 3 may have the filter assemble 140 shown in FIG. 1 or the filter assemble 140*a* shown in FIG. 2. Similarly, the third dichroic filter 150 of the laser light source combiner system 100*a* shown in FIG. 2 can be omitted.

Figure 4:
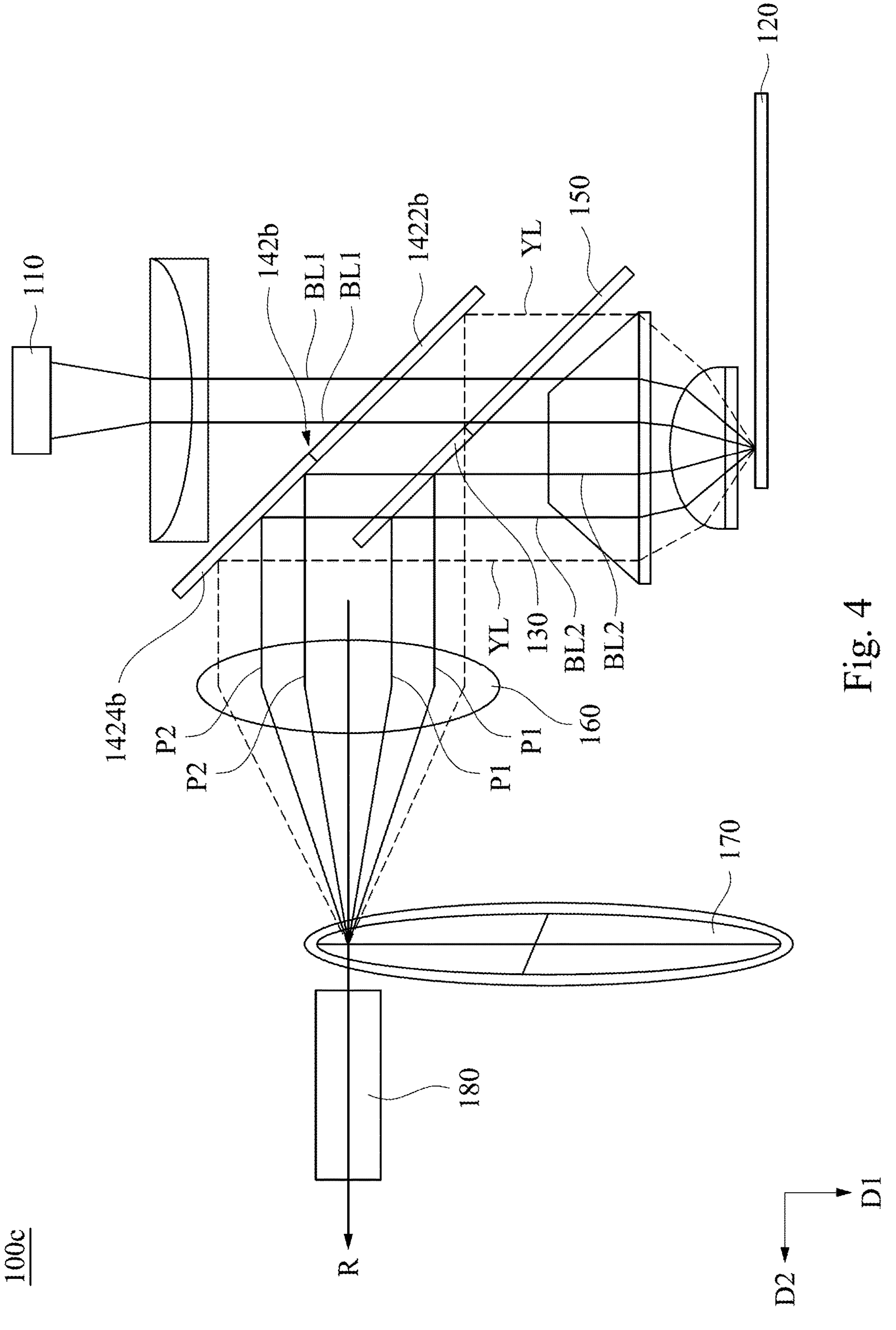
FIG. 4 is a schematic of a laser light source combiner system according to another embodiment of the present disclosure.

FIG. 4 is a schematic of a laser light source combiner system 100*c* according to another embodiment of the present disclosure. The laser light source combiner system 100*c* is similar to the laser light source combiner system 100, and the difference is that the laser light source combiner system 100*c* has no reflector 144 shown in FIG. 1. The laser light source combiner system 100*c* includes a second dichroic filter 142*b*, and the first region 1422*b* and the second region 1424*b* of the second dichroic filter 142*b* have different blue light transmittance. The first region 1422*b* of the second dichroic filter 142*b* is configured to transmit the first blue light BL1 and to reflect the fluorescent light YL. The second region 1424*b* of the second dichroic filter 142*b* is configured to reflect the second blue light BL2 and to reflect the fluorescent light YL. For example, in some embodiments, the first region 1422*b* and the second region 1424*b* of the second dichroic filter 142*b* have different coating film such that the blue light transmittances of the first region 1422*b* and the second region 1424*b* are about 100% (transmit the first blue light BL1 completely) and 0% (reflect the second blue light BL2). In other embodiments, the second region 1424*b* can be a reflector, and the first region 1422*b* can be a dichroic filter. These two components collectively form the second dichroic filter 142*b*. It is noted that, the third dichroic filter 150 of the laser light source combiner system 100*c* can be omitted. The laser light source combiner system 100*c* and the laser light source combiner system 100 have the same advantages, and therefore the description is not limited hereinafter.

In summary, the divergent angle and area of a cross section of the second blue light traveling towards the combiner lens can be increased by disposing a first dichroic filter and by dividing the second blue light into two portions, and therefore the blue light uniformity is improved. The divergent angles and areas of the cross sections of the second blue light and the fluorescent light passed the combiner lens are similar, and therefore the intensity uniformity of the combined light is improved. In other words, with such design, there is no need to reflect the blue light in the optical channel many times to improve the light uniformity. Therefore, the laser light source combiner system of the present disclosure can reduce the length of the optical channel and improve the blue light uniformity. In addition, a shorter optical channel can avoid reduction of the light intensity of other color lights (e.g., yellow light, red light, and green light) after being reflected many times.

Reference is made to FIG. 1. Alternatively speaking, the filter assemble 140 of the laser light source combiner system of the present disclosure can be considered as containing two sections. The section at the right-hand side overlaps the first blue light BL1, and the section at the left-hand side overlaps the second blue light BL2. The angle of the blue light traveling along the optical axis R is increased by making the transmittance for the second blue light BL2 of the first dichroic filter 130 greater than the transmittance for the second blue light BL2 of the section at the left-hand side of the filter assemble 140, and therefore the uniformity of the combined blue light uniformity is improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A laser light source combiner system, comprising:
- a laser light source configured to emit a first blue light traveling along a first direction;
- a phosphor wheel, wherein the phosphor wheel and the laser light source are arranged along the first direction, the phosphor wheel is configured to reflect a portion of the first blue light so as to form a second blue light and to convert a portion of the first blue light into a fluorescent light, and the second blue light travels along a reversed direction of the first direction;
- a first dichroic filter located between the laser light source and the phosphor wheel, wherein the first dichroic filter overlaps the second blue light, the first dichroic filter is configured to partially transmit and partially reflect the second blue light and to transmit the fluorescent light; and
- a filter assemble located between the first dichroic filter and the laser light source, wherein the filter assemble is configured to reflect the second blue light that has transmitted the first dichroic filter and reflect the fluorescent light.

2. The laser light source combiner system of claim 1, wherein the filter assemble is configured to transmit the first blue light.

3. The laser light source combiner system of claim 1, further comprising:
- a combiner lens, wherein the combiner lens and the first dichroic filter are arranged along a second direction, and the combiner lens and the filter assemble are arranged along the second direction.

4. The laser light source combiner system of claim 3, wherein the filter assemble further comprises:
- a second dichroic filter, wherein the second dichroic filter comprises a first region and a second region, the first region overlaps the first blue light, the second region overlaps the second blue light, the first region and the second region overlap the fluorescent light, the first region of the second dichroic filter is configured to transmit the first blue light and reflect the fluorescent light, and the second region of the second dichroic filter is configured to transmit the second blue light and reflect the fluorescent light; and
- a reflector located between the second dichroic filter and the laser light source, and the reflector overlaps the second region of the second dichroic filter.

5. The laser light source combiner system of claim 4, wherein the reflector and the second dichroic filter have a distance therebetween.

6. The laser light source combiner system of claim 4, wherein the filter assemble comprises an optical adhesive layer located between the reflector and the second dichroic filter.

7. The laser light source combiner system of claim 4, wherein the combiner lens has an optical axis in parallel with the second direction, and the reflector and the first dichroic filter are arranged symmetrically relative to the optical axis.

8. The laser light source combiner system of claim 1, further comprises a third dichroic filter, wherein the first dichroic filter and the third dichroic filter are arranged in parallel, the third dichroic filter overlaps the first blue light, and the third dichroic filter is configured to transmit the first blue light.

9. The laser light source combiner system of claim 1, wherein the filter assemble comprises:
- a second dichroic filter comprising a first region and a second region, the first region overlaps the first blue light, the second region overlaps the second blue light and the fluorescent light, the first region is configured to transmit the first blue light, and the second region is configured to reflect the second blue light.

10. A laser light source combiner system, comprising:
- a laser light source configured to emit a first blue light traveling along a first direction;
- a phosphor wheel, wherein the phosphor wheel and the laser light source are arranged along the first direction, the phosphor wheel is configured to reflect a portion of the first blue light so as to form a second blue light and to convert a portion of the first blue light into a fluorescent light, and the second blue light travels along a reversed direction of the first direction;
- a first dichroic filter located between the laser light source and the phosphor wheel; and
- a filter assemble located between the first dichroic filter and the laser light source, wherein the filter assemble comprises a first region and a second region, the first region overlaps the first blue light, the second region overlaps the second blue light, a transmittance for the second blue light of the first dichroic filter is greater than a transmittance for the second blue light of the second region of the filter assemble, and a transmittance for the second blue light of the first region of the filter assemble is different from the transmittance for the second blue light of the second region of the filter assemble.

11. The laser light source combiner system of claim 10, wherein the first region of the filter assemble is configured to transmit the first blue light and reflect the fluorescent light.

12. The laser light source combiner system of claim 10, wherein the second region of the filter assemble is configured to reflect the second blue light and reflect the fluorescent light.

13. The laser light source combiner system of claim 10, further comprising:

a combiner lens, wherein the combiner lens and the first dichroic filter are arranged along a second direction, and the combining lens and the filter assemble are arranged along the second direction.

14. The laser light source combiner system of claim 13, wherein the filter assemble comprises:

a second dichroic filter overlapping the first region and the second region; and a reflector located between the second dichroic filter and the laser light source, and the reflector overlaps the second region.

15. The laser light source combiner system of claim 14, wherein the combiner lens has an optical axis in parallel with the second direction, and the reflector and the first dichroic filter are arranged symmetrically relative to the optical axis.

16. The laser light source combiner system of claim 10, further comprises a third dichroic filter, wherein the first dichroic filter and the third dichroic filter are arranged in parallel, the third dichroic filter overlaps the first blue light, the third dichroic filter is configured to transmit the first blue light.

17. The laser light source combiner system of claim 10, wherein the filter assemble comprises:

a second dichroic filter comprising a first region and a second region, the first region overlaps the first blue light, the second region overlaps the second blue light and the fluorescent light, the first region is configured to transmit the first blue light, and the second region is configured to reflect the second blue light.

* * * * *